US012422829B2

United States Patent
Shao et al.

(10) Patent No.: US 12,422,829 B2
(45) Date of Patent: Sep. 23, 2025

(54) SYSTEM AND METHOD FOR LINKAGE ALARM BETWEEN GAS ALARM AND GAS METER

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Hong Li, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/641,302

(22) Filed: Apr. 19, 2024

(65) Prior Publication Data
US 2024/0272621 A1    Aug. 15, 2024

Related U.S. Application Data

(63) Continuation of application No. 18/186,977, filed on Mar. 21, 2023, now Pat. No. 11,989,007.

(30) Foreign Application Priority Data

Feb. 13, 2023   (CN) ........................ 202310104005.8

(51) Int. Cl.
G05B 23/02    (2006.01)
G05B 19/042   (2006.01)
G05B 19/416   (2006.01)

(52) U.S. Cl.
CPC ......... G05B 19/416 (2013.01); G05B 19/042 (2013.01); G05B 23/0205 (2013.01); G05B 2219/45006 (2013.01)

(58) Field of Classification Search
None
See application file for complete search history.

(56) References Cited

U.S. PATENT DOCUMENTS 4,390,869 A * 6/1983 Christen ................ G08B 29/06
                                                         340/634
11,017,321 B1 * 5/2021 Mishra ............... G05B 23/0283
(Continued)

FOREIGN PATENT DOCUMENTS

CN    2070479 U    1/1991
CN    102435938 A    5/2012
(Continued)

OTHER PUBLICATIONS

Liu 'Household gas safety management system' 2019 14th IEEE International Conference on Electronic Measurement & Instruments ICEMI'2019, published 2019.*
(Continued)

*Primary Examiner* — Bernard G Lindsay
(74) *Attorney, Agent, or Firm* — METIS IP LLC

(57) ABSTRACT

A method for linkage alarm between a gas alarm and a gas meter is provided. The method comprises: obtaining a detection signal through electrical connection with the alarm; in response to the detection signal meeting a preset alarm condition, determining a target alarm event corresponding to the detection signal; when the target alarm event is the abnormal gas concentration in the target area, closing, by the gas meter, a gas valve of the gas meter; when the target alarm event is the abnormal operation of the alarm or the abnormal connection of the alarm, receiving a reset instruction; determining a reset alarm event corresponding to the at least one reset operation; determining a credibility of the target alarm event; determining whether to send a control closing instruction to the gas meter based on the
(Continued)

credibility; and closing the gas valve of the gas meter based on the control closing instruction.

14 Claims, 6 Drawing Sheets

(56)     References Cited

U.S. PATENT DOCUMENTS

| | | | |
|---|---|---|---|
| 2006/0059977 A1* | 3/2006 | Kates | G01M 3/2807 |
| | | | 73/40 |
| 2007/0030168 A1* | 2/2007 | Kim | H04Q 9/00 |
| | | | 340/870.07 |
| 2010/0330515 A1 | 12/2010 | Ueki et al. | |
| 2013/0304264 A1 | 11/2013 | Shao | |
| 2015/0048269 A1 | 2/2015 | Shao | |
| 2015/0068287 A1* | 3/2015 | Wilcox | G01M 3/22 |
| | | | 73/40.5 R |
| 2018/0329377 A1* | 11/2018 | Ogden | G01V 1/01 |
| 2018/0365559 A1 | 12/2018 | Tayebi et al. | |
| 2020/0064783 A1 | 2/2020 | Tran et al. | |
| 2020/0309632 A1 | 10/2020 | Shao | |
| 2023/0063604 A1 | 3/2023 | Al Daif et al. | |
| 2023/0175914 A1 | 6/2023 | Diven et al. | |
| 2023/0290239 A1 | 9/2023 | Tobias | |

FOREIGN PATENT DOCUMENTS

| | | |
|---|---|---|
| CN | 102571435 A | 7/2012 |
| CN | 102890650 A | 1/2013 |
| CN | 203274828 U | 11/2013 |
| CN | 104680726 A | 6/2015 |
| CN | 106505378 A | 3/2017 |
| CN | 106569925 A | 4/2017 |
| CN | 108765886 A | 11/2018 |
| CN | 110175737 A | 8/2019 |
| CN | 110830467 A | 2/2020 |
| CN | 111475357 A | 7/2020 |
| CN | 111488233 A | 8/2020 |
| CN | 112330928 A | 2/2021 |
| CN | 112579348 A | 3/2021 |
| CN | 113301560 A | 8/2021 |
| CN | 113879357 A | 1/2022 |
| CN | 114816817 A | 7/2022 |
| CN | 115034929 A | 9/2022 |
| CN | 115512520 A | 12/2022 |
| JP | H0965461 A | 3/1997 |
| JP | 2000306185 A | 11/2000 |
| JP | 2004312134 A | 11/2004 |
| JP | 2005018299 A | 1/2005 |

OTHER PUBLICATIONS

Notification to Grant Patent Right for Invention in Chinese Application No. 202310104005.8 mailed on Jun. 6, 2023, 4 pages.
First Office Action in Chinese Application No. 202310104005.8 mailed on May 20, 2023, 25 pages.

* cited by examiner

SYSTEM AND METHOD FOR LINKAGE ALARM BETWEEN GAS ALARM AND GAS METER

CROSS-REFERENCE TO RELATED APPLICATIONS

This application is a continuation of U.S. patent application Ser. No. 18/186,977, filed on Mar. 21, 2023, which claims priority to Chinese Patent Application No. 202310104005.8, filed on Feb. 13, 2023, the entire contents of which are incorporated herein by reference.

TECHNICAL FIELD

The present disclosure relates to the field of gas meters, and in particular, to a method for linkage alarm between a gas alarm and a gas meter and a system thereof.

BACKGROUND

With development of society, a usage of natural gas has gradually entered thousands of households, and a safe use of gas has become a focus of attention. With tightening of urban gas supervision, gas users are gradually forced to install gas alarms and emergency cut-off devices in some places. If it is necessary to install a gas alarm and an emergency cut-off valve at the same time, a modification amount of the home of the gas user is large, which is not conducive to implementation.

Therefore, it is hoped to provide a method for linkage alarm between a gas alarm and a gas meter and a system thereof, which may cut off the gas valve through the gas meter when needed, so as to ensure the gas usage safety of the gas user.

SUMMARY

One or more embodiments of the present disclosure provide a method for linkage alarm between a gas alarm and a gas meter. The method is applied to a system for linkage alarm and controlling between the gas alarm and the gas meter. The system comprises a management platform and an object platform, and the object platform includes the gas meter and an alarm. The method comprises: obtaining, by the gas meter, a detection signal through electrical connection with the alarm; in response to the detection signal meeting a preset alarm condition, determining, by the gas meter, a target alarm event corresponding to the detection signal, and uploading the target alarm event to the management platform, wherein the target alarm event includes at least one of an abnormal operation of the alarm, an abnormal gas concentration in a target area, and an abnormal connection of the alarm; when the target alarm event is the abnormal gas concentration in the target area, closing, by the gas meter, a gas valve of the gas meter; when the target alarm event is the abnormal operation of the alarm or the abnormal connection of the alarm, receiving, by the gas meter, a reset instruction issued by the management platform, wherein the reset instruction is used to perform at least one reset operation on a reset object, wherein the reset object include at least the alarm; determining, by the gas meter, a reset alarm event corresponding to the at least one reset operation, and uploading the reset alarm event to the management platform; determining, by the management platform, a credibility of the target alarm event based on the reset alarm event; determining, by the management platform, whether to send a control closing instruction to the gas meter based on the credibility of the target alarm event; and closing, by the gas meter, the gas valve of the gas meter based on the control closing instruction issued by the management platform.

One or more embodiments of the present disclosure provide an alarm for linkage alarm and controlling with a gas alarm. The alarm is arranged in an object platform of a system for linkage alarm and controlling between the gas alarm and the gas meter. The object platform further includes the gas meter, and the system further includes a management platform. The alarm includes a detection module, a communication sending module, and an alarm control module. The detection module is configured to output a detection signal according to at least one of a working state of the alarm, a gas concentration in a target area, and a connection state between the alarm and the gas meter. The communication sending module is configured to: send the detection signal to the gas meter; in response to the detection signal meeting a preset alarm condition, determine, by the gas meter, a target alarm event corresponding to the detection signal, and upload the target alarm event to the management platform, wherein the target alarm event includes at least one of an abnormal operation of the alarm, an abnormal gas concentration in a target area, and an abnormal connection of the alarm; when the target alarm event is the abnormal gas concentration in the target area, close, by the gas meter, a gas valve of the gas meter; when the target alarm event is the abnormal operation of the alarm or the abnormal connection of the alarm, receive, by the gas meter, a reset instruction issued by the management platform, wherein the reset instruction is used to perform at least one reset operation on a reset object, wherein the reset object include at least the alarm; determine, by the gas meter, a reset alarm event corresponding to the at least one reset operation, and upload the reset alarm event to the management platform; determine, by the management platform, a credibility of the target alarm event based on the reset alarm event; determine, by the management platform, whether to send a control closing instruction to the gas meter based on the credibility of the target alarm event; and close, by the gas meter, the gas valve of the gas meter based on the control closing instruction issued by the management platform. The alarm control module is configured to control the detection module and the communication sending module.

One or more embodiments of the present disclosure provide a system for linkage alarm and controlling between the gas alarm and the gas meter. The system comprises a management platform and an object platform. The management platform is configured to receive and store a target alarm event sent by the object platform, and perform unified integration, analysis, and management of data. The object platform includes the gas meter and an alarm, and the object platform is configured to receive instructions from the management platform to run and send perception information to the management platform, wherein the gas meter is configured to obtain a detection signal through electrical connection with the alarm; in response to the detection signal meeting a preset alarm condition, the gas meter is configured to determine a target alarm event corresponding to the detection signal, and upload the target alarm event to the management platform, wherein the target alarm event includes at least one of an abnormal operation of the alarm, an abnormal gas concentration in a target area, and an abnormal connection of the alarm; when the target alarm event is the abnormal gas concentration in the target area, the gas meter is configured to close a gas valve of the gas meter;

when the target alarm event is the abnormal operation of the alarm or the abnormal connection of the alarm, the gas meter is configured to receive a reset instruction issued by the management platform, wherein the reset instruction is used to perform at least one reset operation on a reset object, wherein the reset object include at least the alarm; the gas meter is configured to determine a reset alarm event corresponding to the at least one reset operation, and upload the reset alarm event to the management platform; the management platform is configured to determine a credibility of the target alarm event based on the reset alarm event; the management platform is configured to determine whether to send a control closing instruction to the gas meter based on the credibility of the target alarm event; and the gas meter is configured to close the gas valve of the gas meter based on the control closing instruction issued by the management platform.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
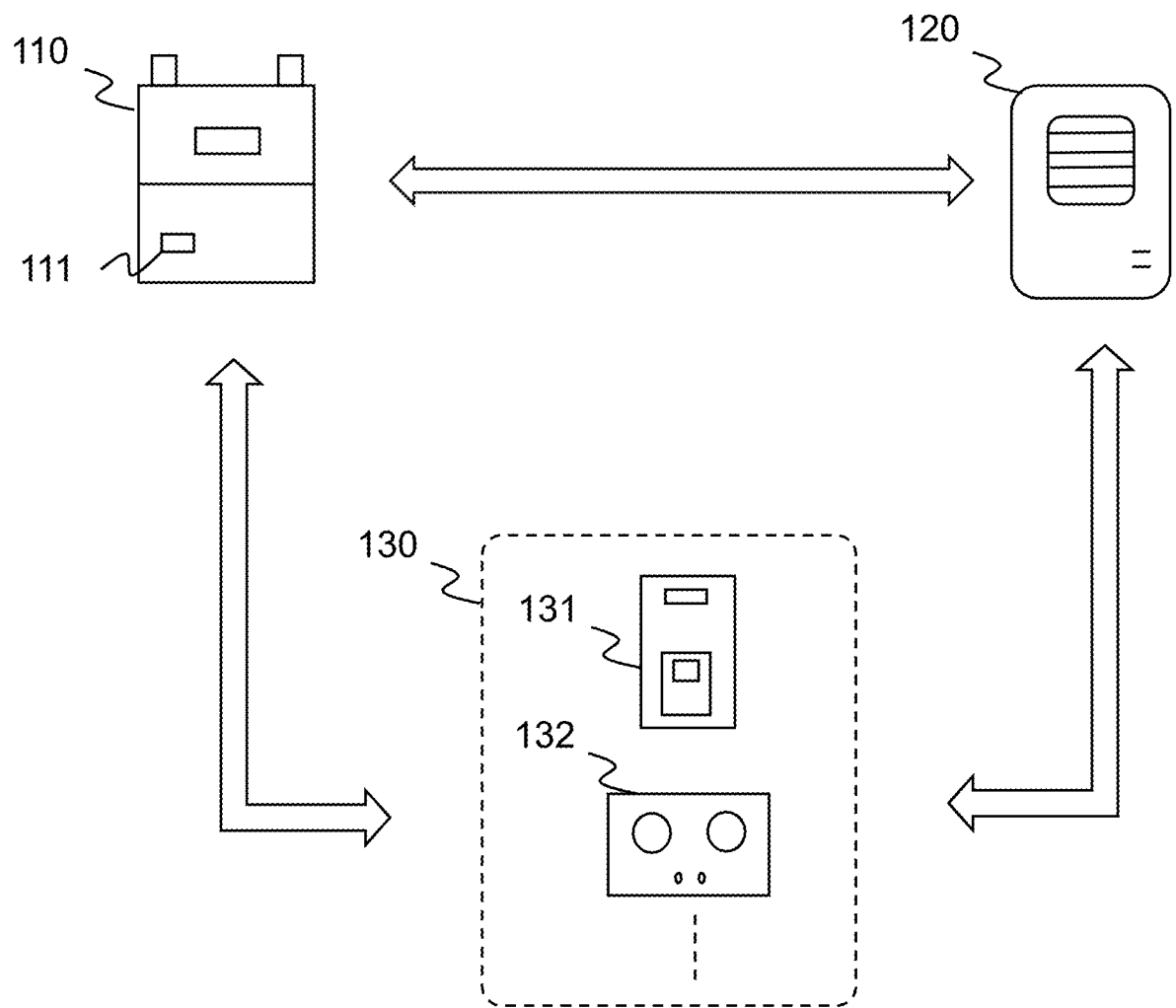
FIG. 1 is a schematic diagram of an application scenario of a system for linkage between an alarm based on gas and a gas meter according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram of an application scenario of a system for linkage between an alarm based on gas and a gas meter according to some embodiments of the present disclosure.

As shown in FIG. 1, an application scenario 100 of the system for linkage between the alarm based on gas and the gas meter may include a gas meter 110, an alarm 120, and a target area 130. In some embodiments, the gas meter 110 and the alarm 120 in the application scenario 100 of the system for linkage between the alarm based on gas and the gas meter may be linked. The alarm 120 may detect relevant conditions in the target area 130 and send a detection signal to the gas meter 110. In response to the detection signal meeting a preset alarm condition, the gas meter 110 may close the gas valve to ensure the safety of gas usage.

The gas meter 110 may refer to a device for recording a gas usage condition. The gas meter 110 may be electrically connected with the alarm 120. For example, the gas meter 110 may be provided with a solenoid valve on a gas intake pipeline, and the alarm 120 may be linked with the solenoid valve provided on the gas intake pipeline of the gas meter 110 to directly cut off the gas intake of the gas meter 110. The gas meter 110 may also open or close the gas valve. In some embodiments, the gas meter 110 may obtain the detection signal sent by the alarm 120 and close the gas valve in response to the detection signal meeting the preset alarm condition. For more information on the detection signal and the preset alarm condition, please refer to FIG. 4 and the related descriptions thereof. In some embodiments, the gas meter 110 may include a gas control module 111. The gas control module 111 may process data and/or information obtained from other devices or components of the application scenario 100. The gas control module 111 may execute program instructions based on these data, information, and/or processing results to perform one or more functions described in the present disclosure. For example, in response to the detection signal meeting the preset alarm condition, the gas control module 111 may determine a target alarm event corresponding to the detection signal. For more information about determining the target alarm event, refer to FIG. 4 and the related descriptions thereof.

The alarm 120 may refer to a device for detecting gas conditions. For example, the alarm 120 may detect a gas concentration in the target area 130 to determine a corresponding detection signal. As another example, the alarm 120 may also detect its own working state and connection state with the gas meter to determine a corresponding detection signal. The alarm 120 may send the detection signal to the gas meter 110 through an electrical connection with the gas meter 110.

The target area 130 may refer to an area where gas monitoring is required. There may be one or more gas consuming devices installed in the target area 130. For example, a water heater 131, a gas stove 132, or other gas consuming devices may be installed in the target area 130.

It should be noted that the application scenario 100 of the system for linkage between the alarm based on gas and the gas meter is provided for illustrative purposes only, and is not intended to limit the scope of the present disclosure. For those skilled in the art, various modifications or changes may be made according to the description in the present disclosure. For example, the application scenario 100 of the system for linkage between the alarm based on gas and the gas meter may also include a network. The gas meter 110 may upload the target alarm event corresponding to the detection signal to the management platform through the network. However, these changes and modifications do not depart from the scope of the present disclosure.

Figure 2:
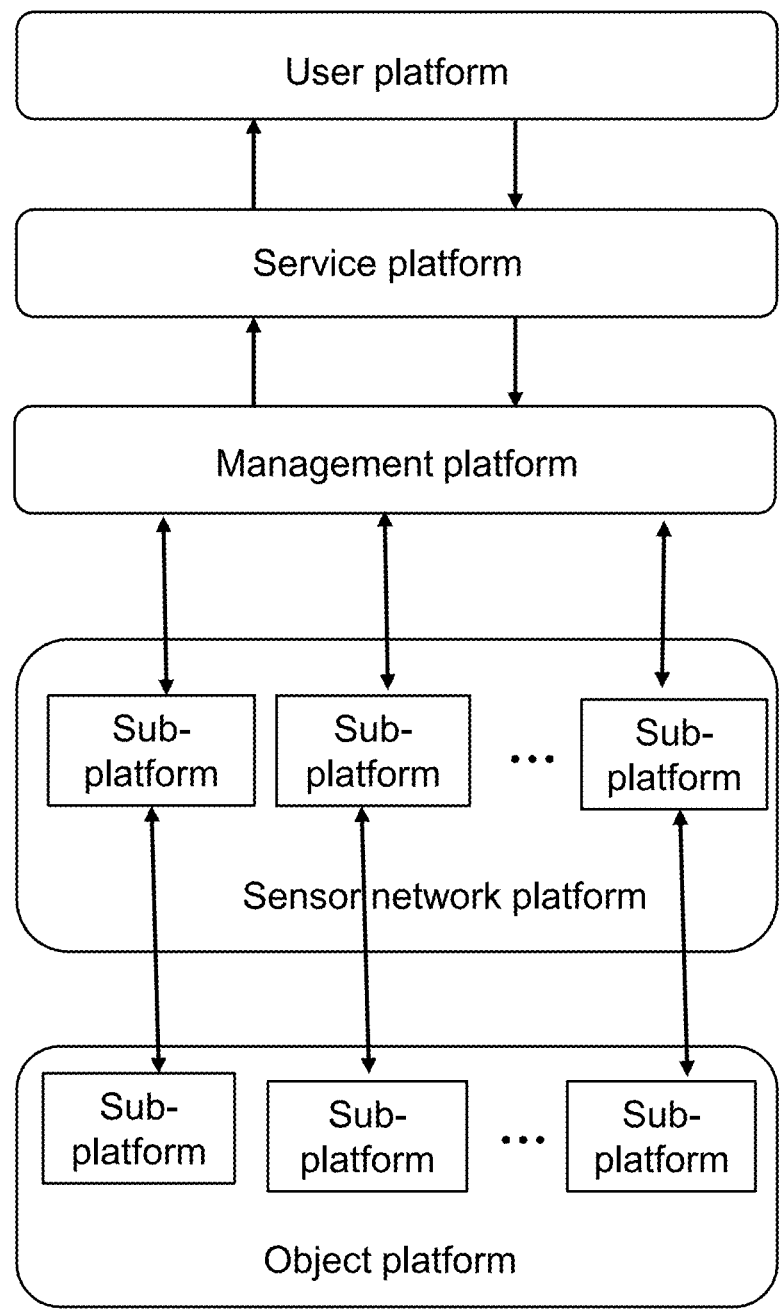
FIG. 2 is a schematic diagram of a platform structure of the system for linkage between the alarm based on gas and the gas meter according to some embodiments of the present disclosure.

FIG. 2 is a schematic diagram of a platform structure of the system for linkage between the alarm based on gas and the gas meter according to some embodiments of the present disclosure.

As shown in FIG. 2, the system 200 for linkage between the alarm based on gas and the gas meter may include a user platform, a service platform, a management platform, a sensor network platform, and an object platform.

The user platform may be a platform for interacting with users. The user platform may be configured as a terminal device, for example, a desktop computer, a tablet computer, a laptop computer, a mobile phone, or other electronic devices capable of data processing and data communication, or the like, or any combination thereof. In some embodiments, the user platform may enable various users (such as gas users, gas managers, etc.) to obtain perception information of user needs through user terminals, send control information to the service platform through the user terminals, and receive corresponding information from the service platform. For example, users may initiate demand information of querying reasons for gas valve closure, reopening gas valves, etc., by the user platform, and receive information such as specific reasons for gas valve closure sent by the service platform. As another example, users may also enter information of the gas meter and information of the alarm in the user platform. For more information about the information of the gas meter and the information of the alarm, please refer to FIG. 6 and the related descriptions thereof.

The service platform may be a medium for exchanging information between the user platform and the management platform. The service platform may receive an instruction sent by the user platform and send the instruction to the management platform after processing. The service platform may also obtain information required by the user from the management platform and send the information to the user platform. In some embodiments, the service platform is configured as a service platform server. In some embodiments, the service platform may also interact with the management platform. For example, the service platform may process the demand information received from the user platform, such as querying the reasons for the gas valve closure and reopening the gas valve and send processed information to the management platform. The service platform may also receive information such as the specific reason for the gas valve closure sent from the management platform.

The management platform may be configured to receive and store target alarm events sent by the object platform, and perform unified integration, analysis, and management of data. The management platform may process the demand information received from the service platform, such as the specific reason for the gas valve closure and send the corresponding information such as the specific reason for the gas valve closure to the service platform. In some embodiments, the management platform may also determine credibility of the target alarm event based on a reset count, a type and number of reset alarm events received within a reset time period, the information of the alarm, the information of the gas meter, historical alarm information, and environmental information. When the credibility is greater than a preset credibility threshold, a control closing instruction may be sent to the gas meter. The management platform may also be configured to send a control opening instruction to the target platform in response to meeting a preset recovery condition. The management platform may also receive, store, and process the target alarm event corresponding to the detection signal uploaded by the sensor network platform, generate a control closing instruction, and send the control closing instruction to the object platform through the sensor network platform.

The sensor network platform may be a functional platform that manages sensor communication. The sensor network platform may be configured as a communication network and gateway for the interaction between the management platform and the object platform, so as to realize functions such as network management, protocol management, instruction management, and data analysis. In some embodiments, the sensor network platform may include multiple sensor network sub-platforms corresponding to the multiple object sub-platforms of the object platform, which are used to obtain and upload relevant data to the management platform. For example, the sensor network platform may obtain use information of the gas meter (for example, a service life of the gas meter, a time of gas usage, an amount of gas usage, etc.), information of the alarm (for example, a service life of the alarm, etc.), target alarm events, etc., from the corresponding sensor network sub-platform and send them to the management platform. In some embodiments, the sensor network platform may also send the control closing instruction received from the management platform to the corresponding object sub-platform.

The object platform may receive instructions of the management platform to run, and send the perception information to the management platform through the sensor network platform. In some embodiments, the object platform may also be provided with multiple object sub-platforms corresponding to multiple sensor network sub-platforms of the sensor network platform. The object sub-platforms may include gas meters and alarms. In some embodiments, the object platform may upload the target alarm event to the management platform through the sensor network platform. The object platform may also receive the control opening instruction or control closing instruction sent by the sensor network platform, and control the gas meter to open or close the gas valve according to the instruction.

Figure 3:
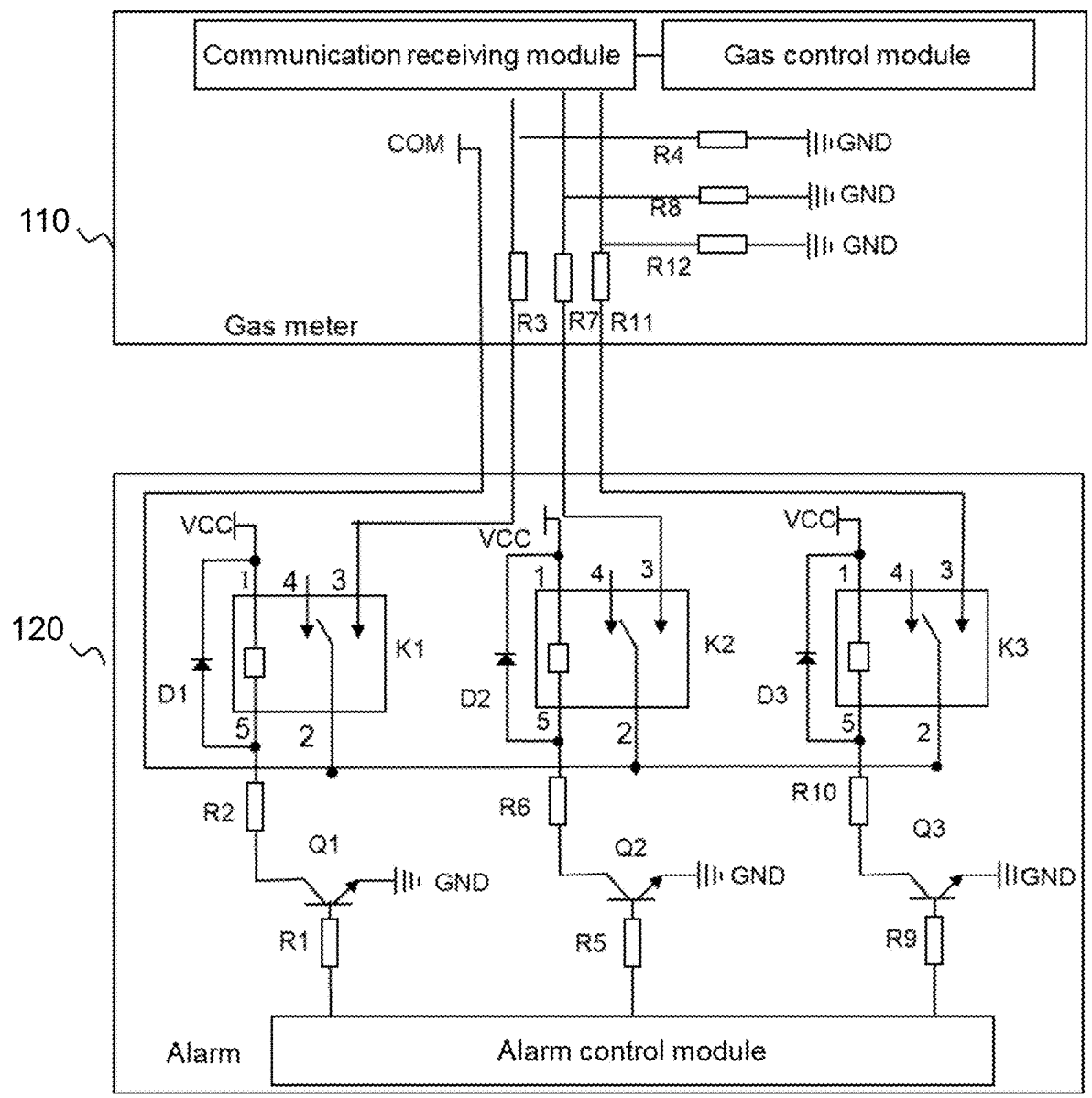
FIG. 3 is a schematic diagram of a circuit of the system for linkage between the alarm based on gas and the gas meter according to some embodiments of the present disclosure.

FIG. 3 is a schematic diagram of a circuit of the system for linkage between the alarm based on gas and the gas meter according to some embodiments of the present disclosure.

In some embodiments, the system for linkage between the alarm and the gas meter may include an alarm and a gas meter.

The alarm may include a detection module, a communication sending module, and an alarm control module. The detection module of the alarm may be configured to detect at least one of the working state of the alarm, the gas concentration in the target area, and the connection state between the alarm and the gas meter, and output the detection signal. The communication sending module of the alarm may be configured to send the detection signal to the gas meter, so that the gas meter may close the gas valve of the gas meter when the detection signal meets the preset alarm condition. The alarm control module may be configured to control the detection module and the communication sending module.

The gas meter may include a communication receiving module and a gas control module. The communication receiving module of the gas meter may be configured to receive the detection signal sent by the alarm. The communication receiving module of the gas meter may send the received detection signal to the gas control module. The gas control module may analyze and process the received detection signal, thereby controlling the opening and closing of the gas valve. In response to the detection signal received by the communication receiving module meeting the preset alarm condition, the gas control module may control the gas valve of the gas meter to close. In response to the detection signal received by the communication receiving module meeting the preset alarm condition, the gas control module may also determine the target alarm event corresponding to the detection signal and upload the target alarm event to the management platform through the sensor network platform. The gas meter may also include other modules, for example, a gas metering module.

The communication sending module may include a first switch module. As shown in FIG. 3, the first switch module may include a resistor R1, a transistor Q1, a resistor R2, a freewheeling diode D1, and a relay K1. The resistor R1, the transistor Q1, and the resistor R2 may constitute a driving circuit of the relay K1. The freewheeling diode may prevent sudden changes in the voltage and current in the circuit and provide a power consumption path for back electromotive force. The first end of the resistor R1 is connected to the signal output end of the alarm control module. The second end of the resistor R1 is connected to the base of the transistor Q1. The emitter of the transistor Q1 is grounded. The collector of the transistor Q1 is connected to the first end of the resistor R2. The second end of the resistor R2 is connected to the control end of the relay K1. The first contact of the relay K1 may be connected to the first end of the freewheeling diode D1, and the second end of the freewheeling diode D1 may be connected to the power supply. The second contact of the relay K1 may be connected to the first end of the protection module. The first protection module may include a resistor R3. The first protection module may be disposed in the alarm, and may also be disposed in the gas meter. The second end of the first protection module may be connected with the communication receiving module. The gas meter may include a resistor R4, the first end of the resistor R4 is connected between the second end of the first protection module and the gas control module, and the second end of the resistor R4 is grounded.

When the detection module of the alarm detects that the working state of the alarm is abnormal, the alarm control module may control the first channel in the first switch module is connected, that is, pins 2-4 of the relay K1 are connected, and pin 3 is suspended. At this time, the relay K1 is in a normally open state, and the detection signal sent by the alarm to the gas meter is a low-level signal. When the detection module of the alarm detects that the working state of the alarm is normal, the fourth channel in the first switch module of the alarm is connected, that is, pins 2-3 of the relay K1 are connected, and pin 4 is suspended. At this time, the relay K1 is in a normally closed state, and the detection signal sent by the alarm to the gas meter is a high-level signal.

The communication sending module may also include a second switch module. As shown in FIG. 3, the second switch module may include a resistor R5, a transistor Q2, a resistor R6, a freewheeling diode D2, and a relay K2. The resistor R5, the transistor Q2, and the resistor R6 may constitute a driving circuit of the relay K2. The first end of the resistance R5 is connected to the signal output end of the alarm control module. The second end of the resistance R5 is connected to the base of the transistor Q2. The emitter of the transistor Q2 is grounded. The collector of the transistor Q2 is connected to the first end of the resistance R6. The second end of the resistance R6 is connected to the control end of the relay K2. The first contact of the relay K2 may be connected to the first end of the freewheeling diode D2. The second end of the freewheeling diode D2 may be connected to the power supply. The second contact of relay K2 is connected with the first end of the second protection module. The second protection module may include a resistor R7. Similar to the first protection module, the second protection module may be disposed on in the alarm or in the gas meter. The second end of the second protection module may be connected with the communication receiving module. The gas meter may include a resistor R8, the first end of the resistor R8 is connected between the second end of the second protection module and the gas control module, and the second end of the resistor R8 is grounded.

When the detection module of the alarm detects that the gas concentration in the target area is greater than the preset concentration threshold, the alarm control module may control the second channel in the second switch module to be connected, i.e., the pins 2-3 of the relay K2 are connected, and the pin 4 is suspended here. When the relay K2 is in the normally closed state, the detection signal sent by the alarm to the gas meter is a high-level signal. When the detection module of the alarm detects that the gas concentration in the target area is not greater than the preset concentration threshold, the fifth channel in the second switch module of the alarm is connected, i.e., the pins 2-4 of relay K2 are connected, and the pin 3 is suspended. At this time, the relay K2 is in a normally open state, and the detection signal sent by the alarm to the gas meter is a low-level signal.

The communication sending module may also include a third switch module. As shown in FIG. 3, the third switch module may include a resistor R9, a transistor Q3, a resistor R10, a freewheeling diode D3 and a relay K3. The resistor R9, the transistor Q3, and the resistor R10 may constitute a driving circuit of the relay K3. The first end of the resistance R9 is connected to the signal output end of the alarm control module. The second end of the resistance R9 is connected to the base of the transistor Q3. The emitter of the transistor Q3 is grounded. The collector of the transistor Q3 is connected to the first end of the resistance R10. The second end of the resistance R10 is connected to the control end of the relay K3. The first contact of the relay K3 may be connected to the first end of the freewheeling diode D3. The second end of the freewheeling diode D3 may be connected to the power supply, the second contact of relay K3 is connected with the first end of the third protection module. The third protection module may include a resistor R11. Similar to the first protection module, the third protection module may be set in the alarm or the gas meter. The second end of the third protection module may be connected with the communication receiving module. The gas meter may include a resistor R12, the first end of the resistor R12 is connected between the second end of the third protection module and the gas control module, and the second end of the resistor R12 is grounded.

When the detection module of the alarm detects that the connection state between the alarm and the gas meter is not connected, the alarm control module may control the third channel in the third switch module to communicate, that is, the pins 2-3 of the relay K3 are connected, and the pin 4 is connected. At this time, the relay K3 is in a normally closed state, and the detection signal sent by the alarm to the gas meter is a high-level signal. When the detection module of the alarm detects that the connection state between the alarm and the gas meter is connected, the sixth channel in the third switch module of the alarm is connected, i.e., the pins 2-4 of relay K3 are connected, and the 3 pin is suspended. At this time, relay K3 is in a normally open state, and the detection signal sent by the alarm to the gas meter is a low-level signal.

In some embodiments, the gas meter may form an electrical connection with the alarm through a plug. The plug may be an aviation plug. The gas meter may include multiple nodes. For example, the gas meter may include four nodes, namely nodes 1 to 4. Node 1 is a positive output point of the power supply of the gas meter, and voltage may be provided for the common terminal of the relay in the alarm through the node 1. The voltage provided by the gas meter may be 3 V. Node 2 is a normally closed contact, when the node 2 of the gas meter is a closed node, it means that the alarm is working normally, and when the node 2 is an open node, it means that the alarm is working abnormally. Node 3 is a normally open contact, when the node 3 of the gas meter is an open node, it means that the gas concentration in the target area is normal, and when the node 3 is a closed node, it means that the gas concentration in the target area is abnormal. Node 4 is a normally open contact, when the node 4 of the gas meter is an open node, it means that the alarm is connected normally, and when the node 4 is a closed node, it means that the connection of the alarm is abnormal. The female connector may be set on the gas meter, and the socket in the female connector may correspond to the node of the gas meter. In some embodiments, the gas meter may have a closed terminal when it leaves the factory, and the nodes 1 and 2 in the terminal are short-circuited. When the gas user does not install a corresponding alarm, the gas meter may work normally. Nodes 1 and 4 are short-circuited, indicating that the gas meter is not connected to the corresponding alarm when it leaves the factory. The alarm may also include multiple nodes. For example, the alarm may include nodes 1~6, where nodes 1 and 2 represent normally open node signals, and when the alarm works normally, nodes 1 and 2 are normally closed nodes. When the alarm works abnormally, nodes 1 and 2 are normally open nodes. Nodes 3 and 4 are normally open nodes. When the alarm detects that the gas concentration in the target area is greater than the preset concentration threshold, nodes 3 and 4 are closed and last until the alarm is eliminated. Nodes 5 and 6 are normally open nodes, which may be used to connect an emergency shut-off valve of the gas user. When the alarm detects that the gas concentration in the target area is greater than the preset concentration threshold, nodes 5 and 6 are closed and last until the alarm is eliminated. The male connector may be disposed on the alarm, and the plugs in the male connector may correspond to the nodes of the alarm. In some embodiments, the linkage between the alarm and the gas meter may be realized by connecting the female connector on the gas meter to the male connector on the alarm.

Figure 4:
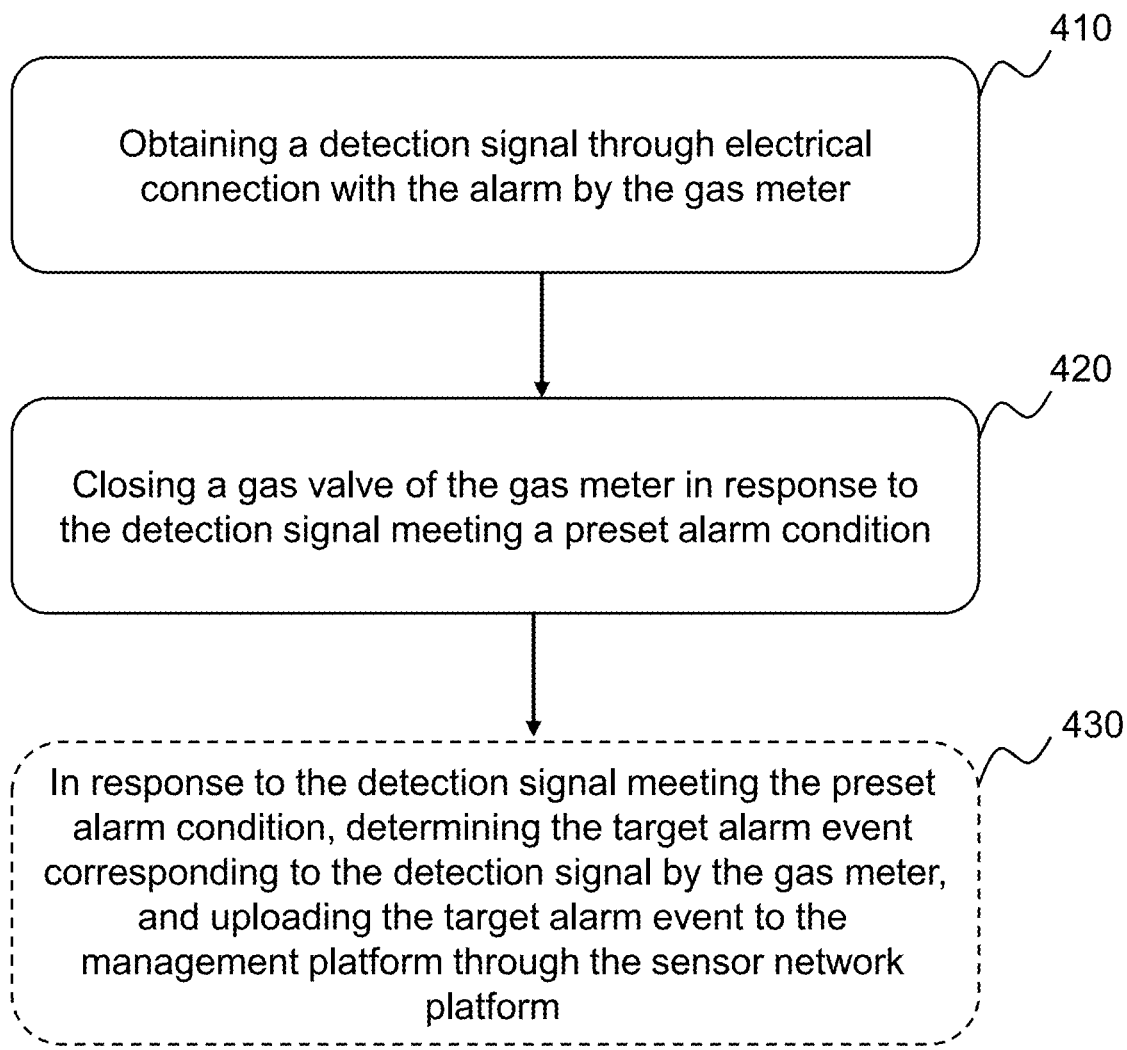
FIG. 4 is a flowchart illustrating an exemplary process of a method for linkage between an alarm based on gas and a gas meter according to some embodiments of the present disclosure.

FIG. 4 is a flowchart illustrating an exemplary process of a method for linkage between an alarm based on gas and a gas meter according to some embodiments of the present disclosure. In some embodiments, a process 400 may be performed by the gas meter. As shown in FIG. 4, the process 400 may include the following steps.

Step 410, obtaining a detection signal through electrical connection with the alarm by the gas meter.

The detection signal may refer to a signal sent by the alarm to detect itself or the environment.

The detection signal may include a signal sent by the alarm after detecting its own working state. In some embodiments, when the alarm may detect its working state. When the alarm detects that its working state is not working, the alarm may control the first channel to be connected and send the detection signal. When the first channel of the alarm is connected, the gas meter may obtain the detection signal transmitted through the first channel of the alarm based on the electrical connection with the alarm. When the working state of the alarm is normal working, the fourth channel of the alarm may remain connected, and the gas meter may continuously obtain the detection signal sent by the alarm.

The detection signal may also include a signal sent by the alarm when the gas concentration in the target area meets the preset concentration condition. The preset concentration condition may include that the gas concentration in the target area is greater than a preset concentration threshold. In some embodiments, the alarm may also detect the gas concentration in the target area. When the alarm detects that the gas concentration in the target area is greater than the preset concentration threshold, the alarm may control the second channel to be connected and send the detection signal. When the second channel of the alarm is connected, the gas meter may obtain the detection signal transmitted through the second channel of the alarm based on the electrical connection with the alarm.

The detection signal may also include a signal sent by the alarm when the connection state between the alarm and the gas meter meets the preset state condition. The preset state condition may include that the connection state between the alarm and the gas meter is not connected. In some embodiments, the alarm may also detect the connection state between the alarm and the gas meter. When the alarm detects that the connection state between the alarm and the gas meter is not connected, the alarm may control the third channel to be connected and send out the detection signal. When the third channel of the alarm is connected, the gas meter may obtain the detection signal transmitted through the third channel of the alarm based on the electrical connection with the alarm.

Step 420, closing a gas valve of the gas meter in response to the detection signal meeting a preset alarm condition.

The preset alarm condition may be an alarm condition set in advance. For example, the preset alarm condition may be obtained through preset settings by users (for example, gas management personnel, gas users, etc.).

In some embodiments, when the gas meter obtains the detection signal sent by the alarm through the first channel, the preset alarm condition may be that a detection signal level is less than a first threshold. The first threshold may be preset by the user. For example, the first threshold may be 0.2 V, and the preset alarm condition may be that the detection signal level is less than 0.2 V.

In some embodiments, when the gas meter obtains the detection signal sent by the alarm through the second channel, the preset alarm condition may be that the detection signal level is greater than a second threshold. The second threshold may be preset by the user. For example, the second threshold may be 4 V, and the preset alarm condition may be that the detection signal level is greater than 4 V.

In some embodiments, when the gas meter obtains the detection signal sent by the alarm through the third channel, the preset alarm condition may be that the detection signal level is greater than a third threshold. The third threshold may be preset by the user.

In some embodiments, the gas meter may immediately close its gas valve in response to the detection signal meeting the preset alarm condition.

In some embodiments, the gas meter may also judge a target alarm event corresponding to the detection signal in response to the detection signal meeting the preset alarm condition. For more details about determining the target alarm event, refer to step 430 and the related descriptions thereof.

In some embodiments, when the target alarm event is an abnormal gas concentration in the target area, the gas meter may immediately close the gas valve. When the target alarm event is an abnormal gas concentration, the target alarm event may also include gas concentration information in the target area. The alarm may obtain the gas concentration information in the target area through the detection module, and adjust the detection signal based on the gas concentration information. The gas concentration information may be specific data of the gas concentration in the target area, or a range value of the gas concentration in the target area. The gas meter may determine the gas concentration information in the target area and send it to the management platform according to a preset correspondence based on a received detection signal. The management platform may determine an elimination operation for the target alarm event based on the gas concentration information of the target alarm event. For example, when the gas concentration information in the target alarm event belongs to a preset first concentration range, the management platform may contact the gas user to understand the relevant situation and guide the gas user to perform gas dilution treatment. When the gas concentration information in the target alarm event belongs to a preset second concentration range, the management platform may directly contact the neighborhood committee where the gas user is located and the fire department to investigate and eliminate the target alarm event.

In some embodiments of the present disclosure, when the target alarm event is the abnormal gas concentration in the target area, the gas concentration information in the target area may also be obtained, and different exclusion operations may be taken purposefully to avoid accidents caused by improper processing of the target alarm event based on different gas concentration information. For example, when the second concentration range is that the gas concentration is greater than 5%, at this time, if the management platform directly contacts the gas user by phone, it may cause gas explosion due to the usage of the phone by the gas user. Therefore, in this case, the management platform may directly contact the neighborhood committee of the gas user and the fire department to investigate and eliminate the target alarm event.

In some embodiments, when the target alarm event is the abnormal operation of the alarm or the abnormal connection of the alarm, the management platform may control the alarm to reset, and judge whether it is necessary to send a control closing instruction to the gas meter based on a reset result, so that the gas meter may close the gas valve in response to the above control closing instruction. For more details about the above embodiments, refer to FIG. 5 and the related descriptions thereof.

Some embodiments of the present disclosure may determine whether to close the gas valve of the gas meter immediately according to the type of the target alarm event. When the target alarm event is abnormal gas concentration in the target area, the gas meter may immediately close the gas valve to avoid accidents. When the target alarm event is abnormal alarm operation or alarm connection, the management platform may reset the alarm and determine whether the gas valve needs to be closed based on the reset result to avoid false alarm caused by device failure and improve the accuracy of the linkage between the alarm and the gas meter.

In some embodiments, the gas meter may also upload the target alarm event corresponding to the detection signal to the management platform, so that the management platform may monitor and guide the gas usage safety of the gas user. As shown in FIG. 4, a process 400 may also include the following steps.

Step 430, in response to the detection signal meeting the preset alarm condition, determining the target alarm event corresponding to the detection signal by the gas meter, and uploading the target alarm event to the management platform through the sensor network platform.

The target alarm event may refer to an event currently alarmed by the alarm. The target alarm event may include at least one of the abnormal operation of the alarm, the abnormal gas concentration in the target area, and the abnormal connection of the alarm.

In some embodiments, in response to the detection signal meeting the preset alarm condition, the gas meter may determine the target alarm event corresponding to the detection signal. When the gas meter obtains the detection signal sent by the alarm through the first channel, and the detection signal level is lower than a first threshold, it may be determined that the target alarm event corresponding to the detection signal is the abnormal operation of the alarm. When the gas meter obtains the detection signal sent by the alarm through the second channel, and the detection signal level is greater than a second threshold, it may be determined that the target alarm event corresponding to the detection signal is the abnormal gas concentration in the target area. When the gas meter obtains the detection signal sent by the alarm through the third channel, and the detection signal level is greater than a third threshold, it may be determined that the target alarm event corresponding to the detection signal is the abnormal connection of the alarm.

In some embodiments of the present disclosure, the linkage between the gas meter and the alarm may be used to detect the alarm and the target area, and when it is necessary, the gas valve may be closed through the gas meter to ensure the safety of gas usage. At the same time, closing the gas valve through the gas meter may avoid the installation of a gas emergency shut-off valve, reduce installation procedures and cost, and save resources.

In some embodiments, after receiving the target alarm event sent by the gas meter, the management platform may be further configured to understand the target alarm event, and give guidance and suggestions for eliminating the target alarm event. In response to meeting a preset recovery condition, the management platform may send a control opening instruction to the gas meter through the sensor network platform. The control opening instruction is used to control the gas meter to open its gas valve. The preset recovery condition may be a condition for determining that the target alarm event is eliminated. For example, when the target alarm event is that the alarm works abnormally, the preset recovery condition may be that the alarm works normally. As another example, when the target alarm event is the abnormal gas concentration in the target area, the preset recovery condition may be that the gas concentration in the target area is not greater than the preset concentration threshold. As another example, when the target alarm event is the abnormal connection of the alarm, the preset recovery condition may be that the connection between the alarm and the gas meter is restored.

The management platform may be configured to send relevant information to the user platform and confirm whether the preset recovery condition is met based on feedback of the gas user. The gas user may also actively feed whether the preset recovery condition is met back to the management platform through the user platform.

In some embodiments of the present disclosure, the management platform may send the control opening instruction to the gas meter in response to meeting the preset recovery condition to prevent the gas user from opening the valve automatically under dangerous conditions and ensure the gas usage safety of the gas user.

Figure 5:
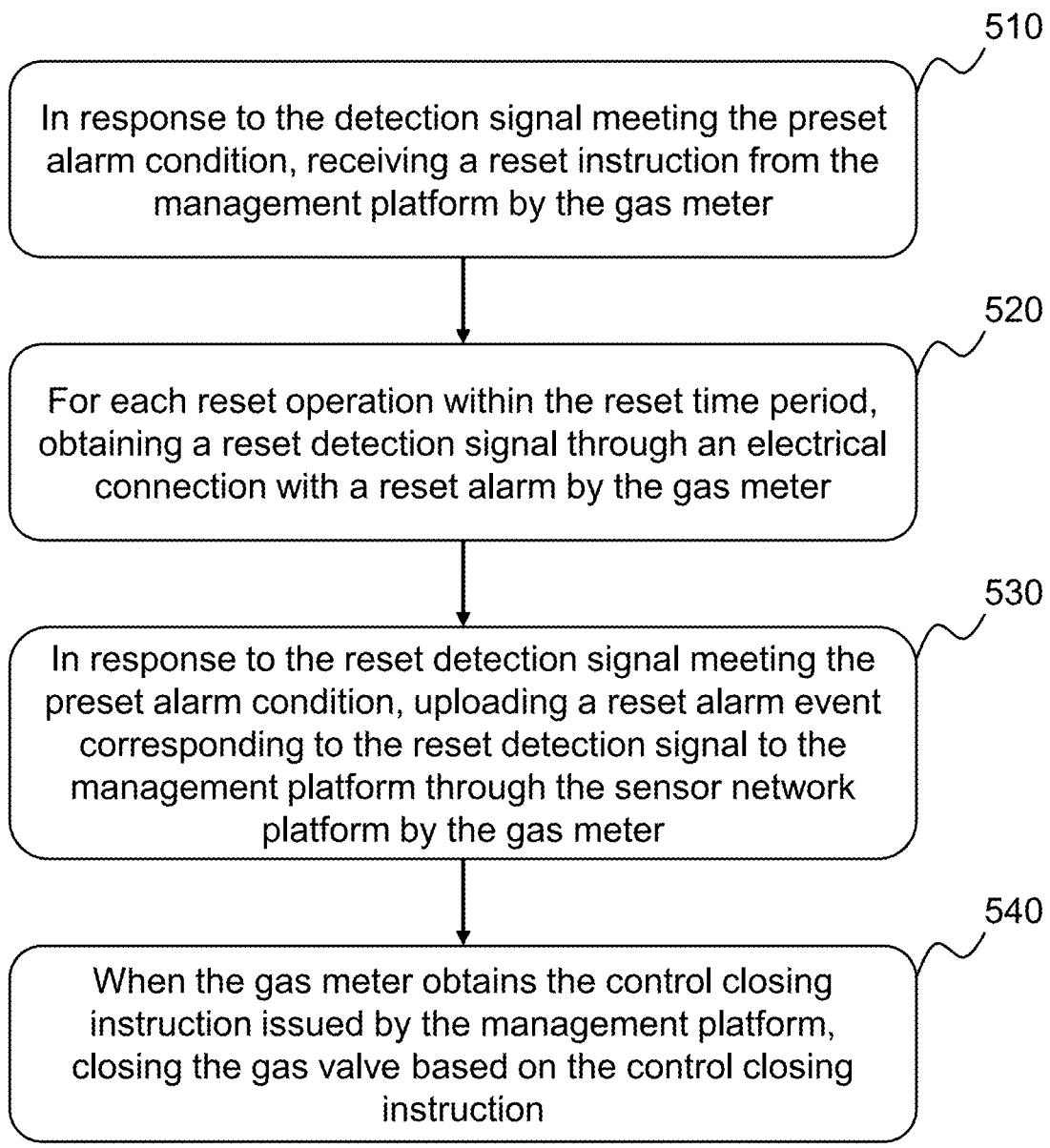
FIG. 5 is a flowchart illustrating another exemplary process of the method for linkage between the alarm based on gas and the gas meter according to some embodiments of the present disclosure.

FIG. 5 is a flowchart illustrating another exemplary process of the method for linkage between the alarm based on gas and the gas meter according to some embodiments of the present disclosure.

In some embodiments, when the target alarm event is the abnormal operation of the alarm or the abnormal connection of the alarm, the gas meter may execute the process 500 to determine whether the gas valve needs to be closed. As shown in FIG. 5, the process 500 may include the following steps.

Step 510, in response to the detection signal meeting the preset alarm condition, receiving a reset instruction from the management platform by the gas meter.

The reset instruction may refer to an instruction to reset a reset object. In some embodiments, the reset instruction may include a reset time period, a reset object, and a reset count. The reset time period is a time period that the gas meter and/or alarm need to be reset. The reset count may be a count of times the device needs to be reset within the reset time period. The reset object may be a device that needs to be reset. In some embodiments, the reset object at least includes the alarm. In some embodiments, the reset object may also include the gas meter. The reset instruction may be determined by preset. For example, the reset instruction may be preset as: the reset time period being five minutes, the reset count being five times, and the reset object being the alarm.

In some embodiments, the management platform may determine the reset count based on at least one of historical alarm information and the information of the alarm. The historical alarm information may include a historical alarm event and its credibility from the gas meter received by the management platform. The management platform may store alarm events sent by the gas meter that cause the alarm to send an alarm, determine the credibility of alarm events, and generate the historical alarm information. For determining the credibility of an alarm event, reference may be made to determining the credibility of the target alarm event below. The information of the alarm may refer to related information of the alarm. The information of the alarm may include, but is not limited to, one or more of the pattern of the alarm, a service life of the alarm, maintenance records of the alarm, performance information of the alarm, and false alarm count of the alarm. The management platform may obtain the information of the alarm input by the gas user through the user platform, and may also determine the performance information of the alarm through a performance prediction model. For more information about determining the performance information of the alarm through the performance prediction model, refer to FIG. 6 and the related descriptions thereof.

The management platform may determine the reset count by presetting a corresponding relationship based on at least one of the historical alarm information and the information of the alarm. For example, the management platform may determine the average historical credibility corresponding to each type of the historical alarm event based on the historical alarm information. The management platform may determine the average historical credibility corresponding to the type based on the type of the target alarm event, and then determine the reset count according to the corresponding relationship between the average historical credibility and the reset count (for example, the average historical credibility is greater than 0.8, and the reset count is 5 times).

It should be understood that the management platform may determine a false alarm frequency of the alarm based on the historical alarm information. The larger the false alarm frequency is, the lower the credibility may be. Therefore, multiple resets may be required to determine the credibility of the target alarm event. In addition, the management platform may be also configured to determine the service life of the alarm based on the information of the alarm. The longer the service life of the alarm is, the greater the probability of its failure may be. Therefore, multiple resets may be required to determine the credibility of the target alarm event.

In some embodiments, the gas meter may receive the reset instruction from the management platform through the sensor network platform. After receiving the reset instruction from the management platform, the gas meter may send the reset instruction to the alarm through the electrical connection with the alarm. In some embodiments, the alarm may also receive the reset instruction from the management platform through the sensor network platform. The gas meter and/or the alarm may be reset with a predicted count of times within the reset time period based on the reset signal.

Step 520, for each reset operation within the reset time period, obtaining a reset detection signal through an electrical connection with a reset alarm by the gas meter.

The reset detection signal may be a detection signal sent by the alarm after the alarm is reset. For more information about the reset detection signal and how to obtain the reset detection signal, please refer to the relevant descriptions of the detection signal in FIG. 4.

Step 530, in response to the reset detection signal meeting the preset alarm condition, uploading a reset alarm event corresponding to the reset detection signal to the management platform through the sensor network platform by the gas meter.

The reset alarm event may be an alarm event within the reset time period. Similar to the target alarm event, the reset alarm event may also include at least one of the abnormal operation of the alarm, the abnormal gas concentration in the target area, and the abnormal connection of the alarm. For more information about the reset alarm event, please refer to the relevant descriptions of the detection signal in FIG. 4.

In some embodiments, the management platform may determine whether to send a control closing instruction to the gas meter based on the reset alarm event received within the reset time period. The control closing instruction may be an instruction for controlling the gas meter to close its gas valve.

In some embodiments, the management platform may determine the credibility of the target alarm event based on the reset count, the type and number of reset alarm events received within the reset time period, the information of the alarm, the information of the gas meter, the historical alarm information and the environmental information. The information of the gas meter may refer to related information of the gas meter. The information of the gas meter may include, but not limited to, one or more of the pattern of the gas meter, the service life of the gas meter, the maintenance records of the gas meter, and false alarm count of the gas meter. Similar to the information of the alarm, the management platform may also obtain the information of the gas meter input by the gas user through the user platform. The environmental information may refer to relevant information of the target area, and the environmental information may include but not limited to one or more of temperature and humidity of the target area. In some embodiments, the detection module of the alarm may also detect the environmental information, and transmit the environmental information to the gas meter through the electrical connection, and the gas meter may send the environmental information to the management platform. In some embodiments, the alarm may also directly send detected environment information to the management platform.

The credibility characterizes the trust level of the target alarm event. The credibility may be expressed in a preset form. For example, the credibility may be a value from 0 to 1, and the closer the target alarm event is to 1, the more credible the target alarm event may be.

The management platform may model or use various data analysis algorithms, such as regression analysis and discriminant analysis, to process the reset count, types and numbers of reset alarm events received within the reset time period, the information of the alarm, the information of the gas meter, the historical alarm information, and the environmental information, and determine the credibility of the target alarm events.

In some embodiments, the management platform may determine the reset count, the type and number of reset alarm events received within the reset time period, the information of the alarm, the information of the gas meter, the historical alarm information, and the environment information based on the credibility determination model to determine the credibility of the target alarm event. The credibility determination model is a machine learning model. For example, the credibility determination model may be a deep learning model, a support vector machine, or other machine learning models that may realize their functions. The input of the credibility determination model may include the reset count, the type and number of reset alarm events received within the reset time period, the information of the alarm, the information of the gas meter, the historical alarm information, and the environmental information, and the output of the credibility determination model may include the credibility of the target alarm event.

In some embodiments, the management platform may obtain the credibility determination model through training. The training samples may include a sample reset count corresponding to a sample alarm event, a type and number of reset alarm events received within a sample reset time period, sample information of alarm, sample information of gas meter, sample historical alarm information, and sample environmental information. The sample alarm event may be an alarm event received by the management platform in history. The training samples may be determined through the historical data of the management platform and the user platform. The label of the training sample may be sample credibility of the sample alarm event. The sample credibility may be determined through feedback of the gas user on the sample alarm event. For example, the management platform may determine whether the sample alarm event has a false alarm for the gas user through the user platform. When the sample alarm event is not a false alarm, the management platform may determine that the sample credibility corresponding to the sample alarm event is 1. When the sample alarm event is a false alarm, the management platform may determine that the sample credibility corresponding to the sample alarm event is 0.

The management platform may input the training samples into an initial credibility determination model. The loss function may be constructed based on an output of the initial credibility determination model and training labels. The parameters of the initial credibility determination model may be iteratively updated based on the loss function. The training may be completed and a trained credibility determination model may be obtained until preset condition is met. The preset condition may include, but are not limited to that the loss function converges, a training period reaches a threshold, etc.

In some embodiments, when the credibility of the target alarm event is greater than a preset credibility threshold, the management platform may send the control closing instruction to the gas meter.

Step 540, when the gas meter obtains the control closing instruction issued by the management platform, closing the gas valve based on the control closing instruction.

Some embodiments of the present disclosure may determine the authenticity of the target alarm event by evaluating the credibility of the target alarm event sent by the gas meter, which can avoid false alarms caused by device failures and improve usage experience of the user, thereby ensuring the safety of gas usage.

Figure 6:
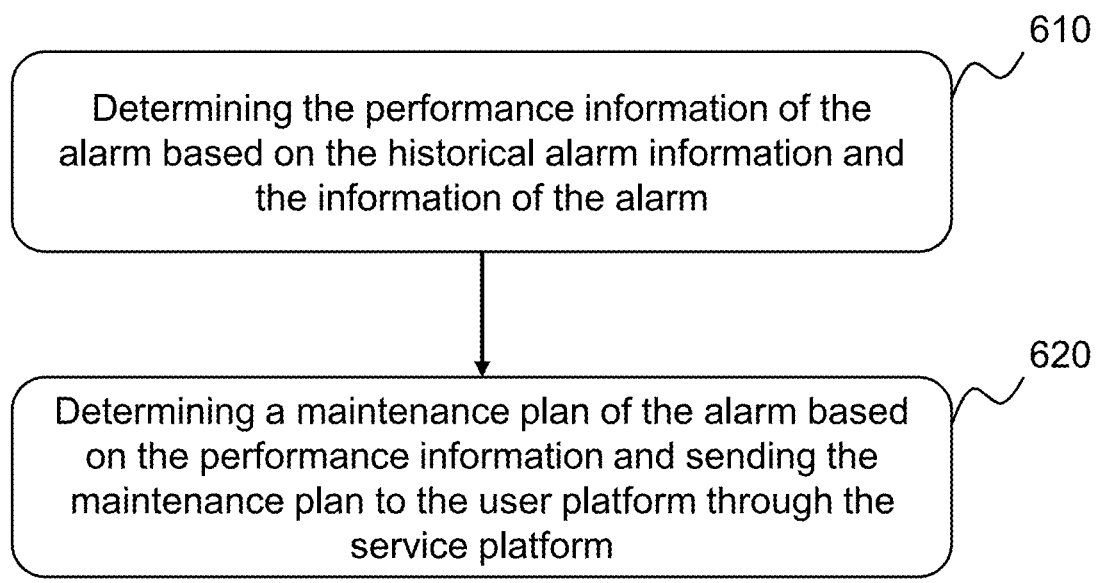
FIG. 6 is a flowchart illustrating an exemplary process for determining a maintenance plan for an alarm according to some embodiments of the present disclosure.

FIG. 6 is a flowchart illustrating an exemplary process for determining a maintenance plan for an alarm according to some embodiments of the present disclosure. In some embodiments, a process 600 may be executed by the management platform. As shown in FIG. 6, the process 600 includes the following steps.

Step 610, determining the performance information of the alarm based on the historical alarm information and the information of the alarm.

The performance information of the alarm may be comprehensive evaluation information of various indicators that affect the normal operation and working effect of the alarm. The performance information may be expressed in a preset form. For example, the credibility may be a value within 0~1. The closer the performance information is to 1, the better the performance of the alarm may be, and the lower the probability of failure may be.

In some embodiments, the management platform may determine the performance information of the alarm based on the historical alarm information corresponding to the alarm and the information of the alarm through a performance prediction model. The performance prediction model may be a machine learning model. For example, the performance prediction model may be a deep neural network model, a convolutional neural network, a recurrent neural network model, or the like, or any combination thereof. In some embodiments, the input of the performance prediction model may include the historical alarm information corresponding to the alarm and information of the alarm. The output of the performance prediction model may include the performance information of the alarm.

The management platform may train the performance prediction model through a plurality of training samples with labels. The plurality of training samples with labels may be input into an initial performance prediction model, and a loss function may be constructed through the labels and output results of the initial performance prediction model, and parameters of the initial performance prediction model may be iteratively updated based on the loss function. When the loss function of the initial performance prediction model satisfies a preset condition, the model training is completed, and a trained performance prediction model is obtained. The preset condition may be that the loss function converges, the number of iterations reaches a threshold, etc. In some embodiments, the training samples may include sample historical alarm information corresponding to the sample alarm and sample information of the alarm. The training samples may be obtained through the historical data of the management platform. The training labels may be sample performance information corresponding to the sample alarm. For example, the management platform may determine the maintenance cost of the sample alarm, and when the maintenance cost of the sample alarm is greater than a preset cost threshold, the training label may be 0. When the maintenance cost of the sample alarm is not greater than the preset cost threshold, the training label may be 1.

Step 620, determining a maintenance plan of the alarm based on the performance information and sending the maintenance plan to the user platform through the service platform.

The maintenance plan may be a repair and treatment plan for the alarm. For example, the alarm needs to be repaired or replaced.

In some embodiments, the management platform may determine an appropriate maintenance plan based on the performance information of the alarm. For example, when the performance information of the alarm is lower than a first performance threshold, the management platform may determine the maintenance plan as replacing the alarm. When the performance information of the alarm is not lower than the first performance threshold but lower than a second performance threshold, the management platform may determine the maintenance plan as repairing the alarm. When the performance information of the alarm is not lower than the second performance threshold, the management platform may determine the maintenance plan as no maintenance or replacement being required.

In some embodiments, the management platform may send the corresponding maintenance plan to the user platform via the service platform. The user may obtain the maintenance plan through the user platform, and reasonably arrange time for corresponding processing.

In some embodiments of the present disclosure, the performance information of the alarm may be determined through the historical alarm information corresponding to the alarm and information of the alarm, which can take into account the influence of the use of the alarm on its own performance and make the determined performance information of the alarm more comprehensive and accurate. According to the performance information of the alarm, the maintenance plan is determined, and the alarm is processed in time, which can reduce the probability of false alarm of alarm events caused by the performance of the alarm. In addition, through the performance prediction model, the performance information of the alarm can be determined more accurately and quickly. There is no need to manually evaluate the alarms one by one, which can reduce labor costs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for linkage alarm between an alarm and a gas meter, wherein the method is applied to a system for linkage alarm and controlling between the alarm and the gas meter, wherein the system comprises a management platform and an object platform, and the object platform includes the gas meter and the alarm, the method comprising:
obtaining, by the gas meter, a detection signal through electrical connection with the alarm; wherein the obtaining a detection signal through electrical connection with the alarm includes:
when a second channel of the alarm is connected, obtaining, by the gas meter, the detection signal transmitted through the second channel based on the electrical connection with the alarm, wherein when the alarm detects that a gas concentration in a target area is greater than a preset concentration threshold, the alarm controls the second channel to be connected;
in response to the detection signal meeting a preset alarm condition, determining, by the gas meter, a target alarm event corresponding to the detection signal; wherein the preset alarm condition includes that a detection signal level is greater than a second threshold, and the determining, by the gas meter, the target alarm event corresponding to the detection signal in response to the detection signal meeting a preset alarm condition includes:
in response to the detection signal level being greater than the second threshold, determining, by the gas meter, the target alarm event corresponding to the detection signal being an abnormal gas concentration in the target area;
uploading the target alarm event to the management platform, wherein the target alarm event includes at least one of an abnormal operation of the alarm, the abnormal gas concentration in the target area, and an abnormal connection of the alarm;
when the target alarm event is the abnormal gas concentration in the target area, closing, by the gas meter, a gas valve of the gas meter;
when the target alarm event is the abnormal operation of the alarm or the abnormal connection of the alarm,
receiving, by the gas meter, a reset instruction issued by the management platform, wherein the reset instruction is used to perform at least one reset operation on a reset object, wherein the reset object include at least the alarm;
determining, by the gas meter, a reset alarm event corresponding to the at least one reset operation, and uploading the reset alarm event to the management platform;
determining, by the management platform, a credibility of the target alarm event based on the reset alarm event;
determining, by the management platform, whether to send a control closing instruction to the gas meter based on the credibility of the target alarm event; and
closing, by the gas meter, the gas valve of the gas meter based on the control closing instruction issued by the management platform.

2. The method of claim 1, wherein the system further comprises a sensor network platform, wherein
the management platform is configured to receive and store the target alarm event sent by the object platform, and perform unified integration, analysis, and management of data,
the object platform is configured to receive instructions from the management platform, run the instructions, and send perception information to the management platform through the sensor network platform; and
the sensor network platform is configured as a communication network and a gateway for the management platform to interact with the object platform.

3. The method of claim 1, wherein the reset instruction includes a reset time period, a reset object, and a reset count.

4. The method of claim 3, wherein the determining, by the gas meter, a reset alarm event corresponding to the at least one reset operation, and uploading the reset alarm event to the management platform includes:
for each reset operation within the reset time period,
obtaining, by the gas meter, a reset detection signal through an electrical connection with a reset alarm;
in response to the reset detection signal meeting the preset alarm condition, uploading, by the gas meter, the reset alarm event corresponding to the reset detection signal to the management platform.

5. The method of claim 3, wherein the determining, by the management platform, a credibility of the target alarm event based on the reset alarm event includes:
determining, by the management platform, the credibility of the target alarm event based on the reset count, a type and number of reset alarm events received within the reset time period, information of the alarm, information of the gas meter, historical alarm information, and environmental information;
the determining, by the management platform, whether to send a control closing instruction to the gas meter based on the credibility of the target alarm event includes:

when the credibility is greater than a preset credibility threshold, sending, by the management platform, the control closing instruction to the gas meter.

6. The method of claim 5, wherein the determining, by the management platform, the credibility of the target alarm event based on the reset count, a type and number of reset alarm events received within the reset time period, information of the alarm, information of the gas meter, historical alarm information, and environmental information includes:
determining the credibility of the target alarm event by processing the reset count, the type and number of reset alarm events received within the reset time period, the information of the alarm, the information of the gas meter, the historical alarm information and the environmental information based on a credibility determination model, wherein the credibility determination model is a machine learning model.

7. The method of claim 3, wherein the management platform is further configured to:
determine the reset count based on at least one of the historical alarm information and the information of the alarm.

8. The method of claim 1, wherein the management platform is further configured to:
determine performance information of the alarm based on historical alarm information and information of the alarm; and
determine, based on the performance information, a maintenance plan of the alarm, and send the maintenance plan to a user platform through a service platform, wherein the user platform is a platform for interacting with a user, and the service platform is a medium for exchanging information between the user platform and the management platform.

9. The method of claim 1, further comprising:
in response to meeting a preset recovery condition, sending, by the management platform, a control opening instruction to the object platform; and
opening, by the gas meter, the gas valve of the gas meter based on the control opening instruction issued by the management platform.

10. The method of claim 1, wherein the obtaining, by the gas meter, a detection signal through electrical connection with the alarm includes:
when a first channel of the alarm is connected, obtaining the detection signal transmitted through the first channel based on the electrical connection with the alarm, wherein when the alarm detects that a working state of the alarm is not working, the alarm controls the first channel to be connected; and
the preset alarm condition includes that the detection signal level is less than a first threshold, and the determining, by the gas meter, a target alarm event corresponding to the detection signal in response to the detection signal meeting the preset alarm condition includes:
in response to the detection signal level being less than the first threshold, determining, by the gas meter, the target alarm event corresponding to the detection signal being the abnormal operation of the alarm.

11. The method of claim 1, wherein the obtaining a detection signal through electrical connection with the alarm includes:
when a third channel of the alarm is connected, obtaining, by the gas meter, the detection signal transmitted through the third channel based on the electrical connection with the alarm, wherein when the alarm detects that a connection state between the alarm and the gas meter is not connected, the alarm controls the third channel to be connected; and
the preset alarm condition includes that the detection signal level is greater than a third threshold, and the determining, by the gas meter, the target alarm event corresponding to the detection signal in response to the detection signal meeting a preset alarm condition includes:
in response to the detection signal level being greater than the third threshold, determining, by the gas meter, the target alarm event corresponding to the detection signal being the abnormal connection of the alarm.

12. A system for linkage alarm and controlling between an alarm and a gas meter, comprising a management platform and an object platform, wherein
the management platform is configured to receive and store a target alarm event sent by the object platform, and perform unified integration, analysis, and management of data,
the object platform includes the gas meter and the alarm, and the object platform is configured to receive instructions from the management platform, run the instructions, and send perception information to the management platform, wherein
the gas meter is configured to obtain a detection signal through electrical connection with the alarm;
in response to the detection signal meeting a preset alarm condition, the gas meter is configured to determine a target alarm event corresponding to the detection signal, and upload the target alarm event to the management platform, wherein the target alarm event includes at least one of an abnormal operation of the alarm, an abnormal gas concentration in a target area, and an abnormal connection of the alarm; wherein the preset alarm condition includes that a detection signal level is greater than a second threshold; and the gas meter is further configured to:
when a second channel of the alarm is connected, obtain the detection signal transmitted through the second channel based on the electrical connection with the alarm, wherein when the alarm detects that a gas concentration in the target area is greater than a preset concentration threshold, the alarm controls the second channel to be connected; and
in response to the detection signal level being greater than the second threshold, determine the target alarm event corresponding to the detection signal being the abnormal gas concentration in the target area;
when the target alarm event is the abnormal gas concentration in the target area, the gas meter is configured to close a gas valve of the gas meter;
when the target alarm event is the abnormal operation of the alarm or the abnormal connection of the alarm, the gas meter is configured to receive a reset instruction issued by the management platform, wherein the reset instruction is used to perform at least one reset operation on a reset object, wherein the reset object include at least the alarm;
the gas meter is configured to determine a reset alarm event corresponding to the at least one reset operation, and upload the reset alarm event to the management platform;
the management platform is configured to determine a credibility of the target alarm event based on the reset alarm event;

the management platform is configured to determine whether to send a control closing instruction to the gas meter based on the credibility of the target alarm event; and the gas meter is configured to close the gas valve of the gas meter based on the control closing instruction issued by the management platform.

13. The system of claim 12, wherein the preset alarm condition includes that the detection signal level is less than a first threshold, and the gas meter is further configured to:

when a first channel of the alarm is connected, obtain the detection signal transmitted through a first channel based on the electrical connection with the alarm, wherein when the alarm detects that a working state of the alarm is not working, the alarm controls the first channel to be connected; and in response to the detection signal level being less than the first threshold, determine the target alarm event corresponding to the detection signal being the abnormal operation of the alarm.

14. The system of claim 12, wherein the preset alarm condition includes that the detection signal level is greater than a third threshold, and the gas meter is further configured to:

when a third channel of the alarm is connected, obtain the detection signal transmitted through the third channel based on the electrical connection with the alarm, wherein when the alarm detects that a connection state between the alarm and the gas meter is not connected, the alarm controls the third channel to be connected; and in response to the detection signal level being greater than the third threshold, determine the target alarm event corresponding to the detection signal being the abnormal connection of the alarm.

\* \* \* \* \*